Patented June 30, 1953

2,644,006

UNITED STATES PATENT OFFICE 2,644,006

SEPARATION OF OXYGENATED ORGANIC COMPOUNDS

Joan Henri van der Waals, Amsterdam, Netherlands, assignor to Shell Development Company, San Francisco, Calif., a corporation of Delaware No Drawing. Application March 7, 1949, Serial No. 80,104. In the Netherlands March 18, 1948

10 Claims. (Cl. 260—450)

This invention relates to an extraction process for separating hydrocarbons and oxy-hydrocarbon compounds which are substantially insoluble in water, starting from mixtures containing these substances. Such mixtures are produced, inter alia, in the synthetic manufacture of hydrocarbons, for example in the Fischer-Tropsch process, whereby carbon monoxide and hydrogen are taken as initial material.

In these synthesis processes there are formed, besides the desired hydrocarbons, by-product oxygen-containing compounds, such as alcohols, aldehydes, ketones and acids. Insofar as these oxygen-compounds are soluble in water, they may be readily extracted and separated from the remaining reaction products in a simple manner by means of water. The remaining reaction products consist of a mixture of hydrocarbons and higher, water-insoluble oxygen-containing compounds.

It has been proposed to separate mixtures of hydrocarbons and oxy-hydrocarbon compounds by extraction with various liquid or liquefied selective solvents. Furthermore, U. S. Patent No. 2,457,257 teaches the use of aqueous solutions of water-soluble bisulfites (e. g. sodium bisulfite) for extracting the aldehydes and ketones from the water-insoluble phase of Fischer-Tropsch synthesis products and the use of the aqueous solution of resulting bisulfite adducts with the aldehydes and ketones as solubilizers for the extraction of the alcohols.

A principal object of the present invention is to provide a simple and inexpensive method of recovering the above referred-to water-insoluble oxy-hydrocarbon compounds. Such a method is of great importance, in view of the fact that these oxygen-containing compounds constitute or contain very valuable products suitable for various uses in the chemical field. A more specific object is the recovery of lower molecular weight, water-insoluble oxy-hydrocarbon compounds from hydrocarbons difficulty separable therefrom by distillation, and especially those water-insoluble aldehydes, ketones, alcohols and esters which contain from about four to about ten carbon atoms per molecule.

In general, the mixtures concerned with do not contain more than about 2% of the said oxy-hydrocarbon compounds. However, this percentage may be raised to as much as about 10% or more by modifying the catalyst and the reaction conditions, provided an adequate method of separation of the mixtures is made available.

Now, in accordance with the present invention, it has been found that the said oxygen-containing compounds are extracted from the hydrocarbons by means of a solvent capable of forming a separate phase when in contact with the present mixtures and consisting essentially of a water-soluble carboxylic acid, generally being a water-soluble fatty acid, e. g., formic acid and acetic acid, admixed with a substantial but minor proportion of water.

As illustrative of a preferred solvent for use in the practice of the invention, the maximum boiling point azeotrope of formic acid and water, which contains about 78% by weight of formic acid, the remainder being water, boiling at 107.3° C. at one atmosphere of pressure, has been found to be a very selective solvent for the attainment of the objects of the invention. The efficacy of such a formic acid-water solvent is readily seen from an examination of the data in Table I, which data were obtained in a determination of the phase equilibrium relationships for the system: formic acid-methyl isobutyl ketone-aromatic-free kerosene at 20° C., wherein the formic acid used was a formic acid-water mixture containing 78% by weight formic acid and 22% by weight water.

TABLE I

*Phase equilibrium for formic acid—methyl isobutyl ketone—kerosene at 20° C.*

[Compositions in percent by volume.]

| Original mixture | | | Extract phase | | | Raffinate phase | | | Distribution ratios | |
|---|---|---|---|---|---|---|---|---|---|---|
| Acid | Ketone | Hydrocarbon | Acid | Ketone | Hydrocarbon | Acid | Ketone | Hydrocarbon | k | k' |
| 45.5 | 9.0 | 45.5 | 85.9 | 14.1 | 0.1 | 0.4 | 3.5 | 96.1 | 4.0 | 0.001 |
| 38.5 | 23.0 | 38.5 | 65.1 | 34.5 | 0.4 | 0.7 | 6.9 | 92.4 | 5.0 | 0.004 |
| 33.3 | 33.3 | 33.3 | 51.8 | 47.1 | 1.2 | 0.9 | 9.2 | 89.9 | 5.1 | 0.013 |

NOTE.—The symbol $k$ denotes the distribution ratio of the ketone and $k'$ denotes the distribution ratio of the hydrocarbon each between the acid and the hydrocarbon phases.

It is evident from the data shown in Table I that a single-solvent extraction in that case may yield methyl ethyl ketone extracts with a purity greater than 99%, on a solvent-free basis. In this respect, it should be borne in mind that the kerosene concentration in the extract phase is the governing factor for the extract purity. This small concentration depends on the water content of the solvent. If a $C_8/C_9$ fraction is used instead of kerosene, the hydrocarbon concentration in the extract phase with less than 25% of the ketone still does not exceed 0.2%. Higher concentrations of the oxyhydrocarbon compound and lower concentrations of water in the solvent result in higher concentrations of the hydrocarobn in the extract phase.

The general relationships between the distribution ratios of corresponding aldehydes, alcohols and ketones, relative to aqueous formic acid solutions and kerosene, are shown in Table II. The influence of the proportion of water in the acid-water solvent is also indicated, as well as the influence of a change in the proportion of the lipophilic part of the oxy-hydrocarbon compound, as by increasing the size of the hydrocarbyl portion(s) of the compound, on the distribution ratio.

TABLE II

*Distribution ratios of oxy-hydrocarbon compound between aqueous formic acid and kerosene*

| Formic acid-Water Solution | Distribution ratio | | | |
|---|---|---|---|---|
| | $C_5$-aldehydes | $C_5$-alcohols | $C_5$-ketones | $C_9$-ketones |
| 78% by wt. acid; 22% by wt. water (ca. 43 mol percent water) | 2/1 | 4/1 | 5/1 | 0.3/1 |
| 25 mol percent water | 4/1 | 8/1 | 10/1 | 1.5/1 |

NOTE.—The above values are for the cases where the oxy-hydrocarbon is from about zero to 10% by weight of the hydrocarbon fraction.

It is to be seen by a comparison of the distribution ratios of the $C_5$-ketones and the $C_9$-ketones that, as the proportion of the part of the ketone contributing to the lipophilic character of the ketone increases, the polarity of the solvent mixture must be lowered, as by lowering the water content, in order to main optimum distribution ratio for the extraction. However, at the same time sufficient polarity must be maintained to insure the existence of separate extract and raffinate phases. In the case of formic acid, the polarity of the acid is sufficiently high to insure separate phases even in the substantial absence of water. Of course, as already noted, the presence of the water not only affects the distribution ratio of the oxy-hydrocarbon compound between the extractant and the hydrocarbon, but, especially in the case of the lower hydrocarbons, it is a determining factor in minimizing the solution of the hydrocarbon in the extract phase.

When it is desired to employ acetic acid as the acid component of the solvent mixture, the proportion of water used is generally higher than when using formic acid. Thus, aqueous acetic acid which already contains about 10% by weight of water begins to be somewhat similar for the purpose to substantially pure formic acid. With acetic acid it is necessary to employ a substantial proportion of water of at least 5 to 10% by weight. In the first place, the water is required to insure adequate phase separation, since the higher hydrocarbons, such as are found in kerosene, and the like, more readily dissolve acetic acid, especially in the presence of the water-insoluble oxy-hydrocarbon compounds which also function as solubilizers for the acetic acid in the hydrocarbon. In the second place, the more lipophilic acetic acid has greater solvent power for the hydrocarbons than does formic acid. With propionic acid still larger proportions of water are required. In fact, the proportion of water which is required to insure the existence of the greater proportion of the propionic acid in a separate extract phase is of such a value that the distribution ratio of the oxy-hydrocarbon compounds between the extractant and the hydrocarbons is already becoming unfavorable for satisfactory separation of the oxy-hydrocarbon compounds from the hydrocarbons.

In accordance with the foregoing relationships, experiments have shown that a separation of diisobutylketone from hydrocarbons is not possible with glacial (that is, water-free) acetic acid; however, the separation may be readily effected with aqueous acetic acid containing a minor but substantial proportion of water, for example aqueous acetic acid containing 10% by weight of water. On the other hand, the same separation may be effected with substantially pure formic acid which contains less than one per cent by weight of water, and even with pure formic acid.

The optimum proportions of water to acid to be employed as extracting solvent cannot be stated beforehand with certainty. It will be understood from the relationships discussed already that the optimum proportions of water to acid will depend on a number of factors, the combination of which will determine the optimum conditions for carrying out the extraction and which combination will vary over a wide range for the different separations to be effected, depending on the acid selected, or mixture of acids if that is desired, the particular mixture selected for separation which may be a narrow boiling range fraction of Fischer-Tropsch products or a very wide boiling range fraction of material, the particular separation which it is desired to effect, and the like. It will be understood that the process may be carried out to effect extraction of only a selected portion of the oxy-hydrocarbon compounds, which selected portion may be based on type of compound and/or on molecular size of compound(s) to be extracted. Thus, as can be seen from the data in Table II, the process may be carried out to fractionally separate ketones of different molecular weight from mixtures thereof; it may also be carried out to separate ketones from aldehydes of the same molecular size. For the extraction of the lower molecular weight oxy-compound a larger proportion of water may be utilized than with the correspondingly higher molecular weight oxy-compound. As a general guide, it may be stated that the aqueous acid should not contain more than about 50% by weight of water, with the upper limit of the water concentration being smaller the higher the molecular weight of the acid being employed. Thus, with formic acid it is preferable to employ a solution which contains not more than about 30% by weight of water, based on the water-formic acid content, whereas with acetic acid and propionic acid it should not be more than about 25% by weight and 20% by weight, respectively. On the other hand, whereas substantially pure formic acid may be utilized, when acetic acid and propionic acid are used, the extracting solvent should contain at least about 5% by weight of water, at least 10% by weight being preferable.

If it is desired, the extraction with water-soluble organic acids in accordance with the invention may be carried out in combination with a second, water-insoluble, non-polar solvent for the hydrocarbons in accordance with the well known methods of dual solvent (duosol) extraction processes. However, an advantage of the process of this invention resides in the fact that extracts consisting of 99% by weight of oxygen-containing compounds can be obtained without the use of a second solvent. This is in contrast to the use, for example, of aqueous methanol, as has been suggested in the art, wherein economical extraction is not possible unless use is made of a second solvent and the duosol type of operation.

In view of the high distribution coefficients of the oxy-hydrocarbon compounds concerned with here with respect to the solvents of the invention and the hydrocarbons present in the mixture to be separated, a relatively small quantity of solvent and a relatively small number of extraction stages will suffice.

If it is desired to use the extractant of this invention in combination with a second solvent, it is generally preferable to use as the second solvent a water-insoluble, relatively non-polar, organic liquid, e. g., a hydrocarbon or hydrocarbon mixture, a suitable halogenated hydrocarbon, and the like, which second solvent also generally differs sufficiently in boiling point or boiling range from the boiling of the mixture to be separated, with a view to the second solvent being readily recovered from the raffinate by distillation so that it may be utilized repeatedly in the process.

The present invention is particularly of interest for the separation of water-insoluble ketones, aldehydes, acids and esters. In the event of alcohols being present in the initial mixtures some esterification may arise; in that case the resulting esters will also be extracted by the solvent.

The process of this invention may be utilized for the separation of initial mixtures arising from other sources than the Fischer-Tropsch process, although, in general the water-insoluble portion of the Fischer-Tropsch products presents the greatest difficulties of separation because of the nature of the mixtures. Other synthesis mixtures which may be processed in accordance with the invention include products obtained in the so-called Oxo process, whereby starting from carbon monoxide and olefins, oxygen-containing compounds are produced synthetically, and usually in admixture with hydrocarbons, including unchanged olefins. The problems of separation involving Oxo-products are increased particularly in the case where the starting material includes mixtures of olefins of different molecular weights and of different types. Mixtures of water-insoluble oxy-hydrocarbon compounds and hydrocarbons are also obtained by applications of the well known Burwell process of partial oxidation of hydrocarbons and their mixtures.

The extraction process of this invention may be carried out under various conditions and in various types of equipment, the separation being effected in a continuous, semi-continuous or batch type of operation, all as will be well understood by those familiar with the practice of solvent extraction operations. Generally, the extraction is carried out at room temperature and under atmospheric pressure. If it is desired to carry out the extraction in a plurality of stages, either in a combination of a plurality of mixing-settling-separating vessels or in a suitable column such as a packed column or any other such device adapted for intimately contacting counterflowing, at least partially immiscible, liquid streams, it is sometimes found to be desirable to increase the ratio of water to acid in the extractant in the direction of flow of said extractant. This may be accomplished by addition of small proportions of water to the system at one or more points therein between the most distant point of supply of the acid solvent and the point of withdrawal of extract phase. With the increase in concentration of oxy-hydrocarbon compounds in the extract phase as the extractant flows through the system, the solubility of hydrocarbons therein tends to increase, which tendency is counteracted by increase in the water to acid ratio of the extractant by the injection of a small proportion of water thereinto.

When a second, higher boiling hydrocarbon, solvent is used in combination with the acid solvent, in a duosol type of extraction wherein the two solvents are introduced separately into the opposite ends of the extraction system and the mixture to be separated is introduced at an intermediate point, the zone between the acid-solvent entry point and the mixture entry point may be considered as the extraction zone while the zone between the mixture entry point and the second solvent entry point may be termed a stripping zone. The higher boiling hydrocarbon, second solvent, functions as a stripping agent to strip from the extract phase dissolved hydrocarbons arising from the mixture being separated. At the same time, however, the second solvent tends to take up acid component of the solvent from the extract. Injection of a small proportion of water into the stripping zone, preferably near the extract outlet end thereof, thereby increasing the polarity of the extract phase, materially assists the stripping action in the stripping zone.

The efficacy of the separation process of the invention is further illustrated by the following example, which is given for the purpose of illustration but is not to be construed as in any manner limiting the invention thereto.

EXAMPLE

A mixture consisting of 9 parts by volume of paraffinic hydrocarbons, having 8 to 9 carbon atoms per molecule, and one part by volume of methyl isobutyl ketone was countercurrently extracted in 7 stages with 4 parts by volume of a solvent consisting of 77.5% by weight of formic acid and 22.5% by weight of water.

Ninety-nine per cent of the ketone was recovered from the extract phase obtained, with a purity of 99%.

I claim as my invention:

1. A process of extracting water-insoluble, oxy-hydrocarbon compounds containing from four to ten carbon atoms per molecule from a lower boiling range fraction of water-insoluble products obtainable by the catalytic synthesis of hydrocarbons from a mixture of carbon monoxide and hydrogen utilizing the Fischer-Tropsch process, which process comprises subjecting a portion of said fraction of products to intimate contact with counter-flowing solvent bodies of an extracting agent comprising a major proportion of formic acid and of a liquid hydrocarbon having a substantially higher boiling range than the boiling range of the hydrocarbons present in said fraction of products, a minor proportion of water, based on the formic acid, being added to the system of counter-flowing solvent bodies at least at one point thereof during said contacting operation, separating resulting extract and raffinate phases, and recovering oxy-hydrocarbon compounds from the separated extract phase.

2. A process of extracting water-insoluble, oxy-hydrocarbon compounds containing from four to ten carbon atoms per molecule from a lower boiling range fraction of water-insoluble products obtainable by the catalytic synthesis of hydrocarbons from a mixture of carbon monoxide and hydrogen utilizing the Fischer-Tropsch process, which process comprises countercurrently contacting a portion of said fraction of products with an extracting agent comprising a major proportion of formic acid, separating resulting extract and raffinate phases, and recovering oxy-hydrocarbon compounds from the separated extract phase.

3. A process of fractionally separating two different water-insoluble, oxy-hydrocarbon compounds containing the same functional groups and containing from four to ten carbon atoms per molecule, which process comprises intimately contacting a mixture of said two compounds in the presence of a liquid hydrocarbon with an aqueous solution of formic acid containing a major proportion of formic acid, separating the resulting extract and raffinate phases one of which is enriched with respect to one of said two compounds and the other of which is enriched with respect to the other one of the two compounds, and recovering an extract which is enriched in one of said compounds from the separated extract phase.

4. A process of extracting water-insoluble, oxy-hydrocarbon compounds containing from four to ten carbon atoms per molecule from mixtures thereof with liquid hydrocarbons, which process comprises intimately contacting said mixture with an aqueous formic acid solution containing about 78% by weight of formic acid, separating the resulting extract and raffinate phases and recovering oxy-hydrocarbon compounds from the separated extract phase.

5. A process of extracting water-insoluble, oxy-hydrocarbon compounds containing from four to ten carbon atoms per molecule from mixtures thereof with liquid hydrocarbons, which process comprises intimately contacting said mixture with aqueous formic acid containing up to about 30% by weight water, separating the resulting extract and raffinate phases and recovering oxy-hydrocarbon compounds from the separated extract phase.

6. A process of extracting water-insoluble, oxy-hydrocarbon compounds containing from four to ten carbon atoms per molecule and selected from the group consisting of aldehydes, alcohols and ketones and mixtures thereof from mixtures thereof with liquid hydrocarbons, which process comprises intimately contacting the oxy-hydrocarbon-hydrocarbon mixture with aqueous formic acid containing up to about 30% by weight water, separating the resulting extract and raffinate phases and recovering oxy-hydrocarbon compounds from the separated extract phase.

7. A process of extracting water-insoluble, oxy-hydrocarbon compounds containing from four to ten carbon atoms per molecule and selected from the group consisting of aldehydes, alcohols and ketones and mixtures thereof from mixtures thereof with liquid hydrocarbons, which process comprises intimately contacting the oxy-hydrocarbon-hydrocarbon mixture with formic acid containing from about 0% to about 50% by weight of water, based on the water-formic acid content to produce a hydrocarbon raffinate phase and a formic acid extract phase, separating the extract and raffinate phases and recovering oxy-hydrocarbon compounds from the separated formic acid extract phase.

8. A process of extracting water-insoluble, oxy-hydrocarbon compounds containing from four to ten carbon atoms per molecule from mixtures thereof with liquid hydrocarbons, which process comprises intimately contacting said mixture with anhydrous formic acid, separating the resulting extract and raffinate phases and recovering oxy-hydrocarbon compounds from the separated extract phase.

9. A process of extracting di-isobutylketone from mixtures thereof with liquid hydrocarbons, which process comprises intimately contacting said mixture with anhydrous formic acid, separating the resulting extract and raffinate phases and recovering di-isobutylketone from the separated extract phase.

10. A process of extracting methyl isobutyl ketone from mixtures thereof with liquid hydrocarbons, which process comprises intimately contacting said mixture with an aqueous formic acid solution containing about 78% by weight of formic acid, separating the resulting extract and raffinate phases and recovering methyl isobutyl ketone compounds from the separated extract phase.

JOAN HENRI van der WAALS.

References Cited in the file of this patent

UNITED STATES PATENTS

| Number | Name | Date |
|---|---|---|
| 1,880,677 | Beck et al. | Oct. 4, 1932 |
| 2,274,750 | Soenksen et al. | Mar. 3, 1942 |
| 2,348,191 | Camelford | May 9, 1944 |
| 2,505,752 | Burton | May 2, 1950 |
| 2,569,385 | Morrell et al. | Sept. 25, 1951 |

FOREIGN PATENTS

| Number | Country | Date |
|---|---|---|
| 330,921 | Great Britain | June 16, 1930 |
| 364,574 | Great Britain | Jan. 6, 1932 |